United States Patent [19]
Evans

[11] 3,958,227
[45] May 18, 1976

[54] CONTROL STORE SYSTEM WITH FLEXIBLE CONTROL WORD SELECTION

[75] Inventor: Charles W. Evans, Poughkeepsie, N.Y.

[73] Assignee: International Business Machines Corporation, Armonk, N.Y.

[22] Filed: Sept. 24, 1974

[21] Appl. No.: 508,797

[52] U.S. Cl. .............................................. 340/172.5
[51] Int. Cl.² ..................... G05B 19/24; G06F 13/08
[58] Field of Search ...................... 445/1; 340/172.5

[56] References Cited
UNITED STATES PATENTS

| | | | |
|---|---|---|---|
| 3,325,785 | 6/1967 | Stevens | 340/172.5 |
| 3,391,394 | 7/1968 | Ottaway et al. | 340/172.5 |
| 3,445,818 | 5/1969 | Yen | 340/172.5 |
| 3,573,854 | 4/1971 | Watson et al. | 340/172.5 |
| 3,656,123 | 4/1972 | Carnevale et al. | 340/172.5 |
| 3,704,448 | 11/1972 | Osborne et al. | 340/172.5 |
| 3,800,293 | 3/1974 | Enger et al. | 340/172.5 |

Primary Examiner—Raulfe B. Zache
Assistant Examiner—Jan E. Rhoads
Attorney, Agent, or Firm—Bernard M. Goldman

[57] ABSTRACT

A branch-address translation register (BAXR) is loaded by a current or a prior control word field. A word selection decoder circuit receives the BAXR outputs and combines them with machine-status signals to generate a word selection signal for selecting a control word from a currently accessed branch group in the control store. A BAXR switching circuit is also provided so that any control word can switch off the BAXR output and cause a control word selection without translation. The invention can obtain any required degree of addressing flexibility in microcode branch selection, i.e. from partial to total flexibility.

9 Claims, 11 Drawing Figures

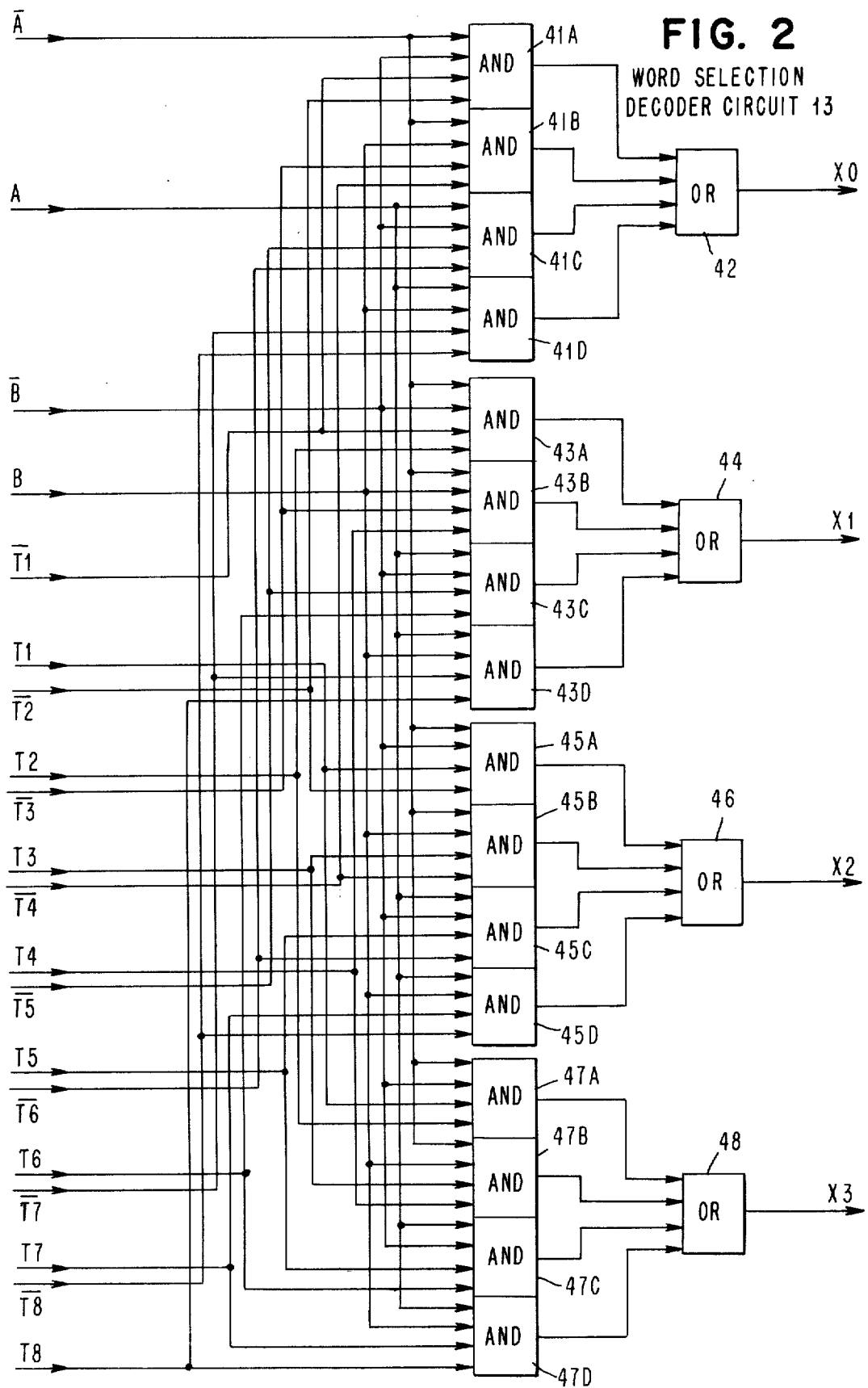

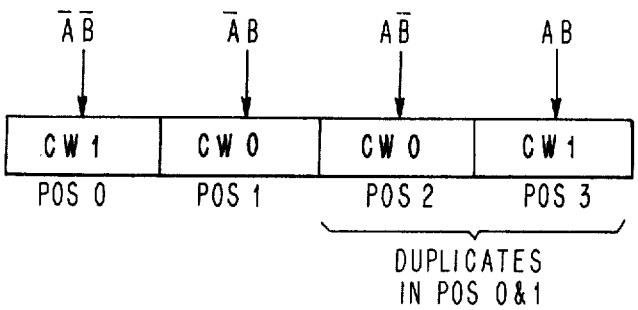
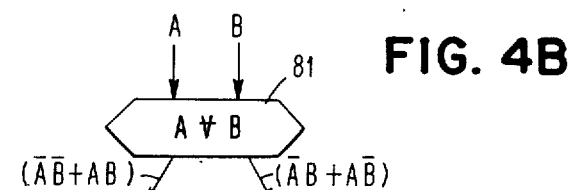
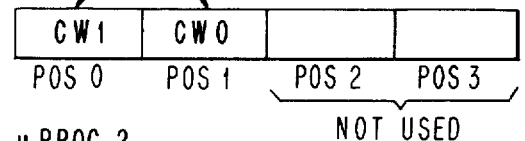
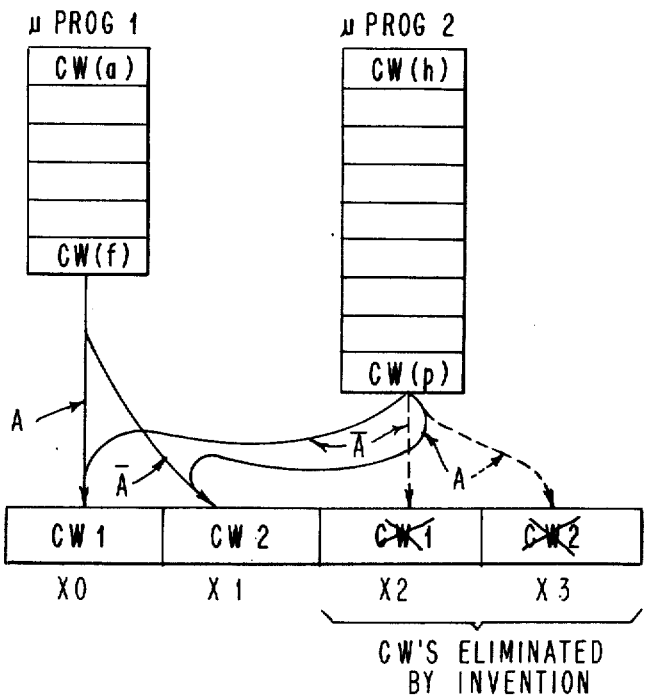

CONTROL STORE SYSTEM WITH FLEXIBLE CONTROL WORD SELECTION

BACKGROUND OF THE INVENTION

This invention relates to control store word-selection systems for controlling the sequence of elementary operations within a central processing unit (CPU). More particularly, the invention relates to branch control means for use in a control store system to increase the flexibility with which control words may be located in a control store.

Many computers built in recent years have utilized control-store control units to control the elementary operations performed by a CPU during the execution of each system instruction. Under control of the control-store control unit, a system instruction is executed by a microprogram which is a sequence of microinstructions (i.e. control words) that control a plurality of elementary operations, some being performed simultaneously and others sequentially. In such systems, the operation code (OP CODE) of the current system instruction is decoded to form the address of the first microinstruction of the microprogram required to perform the system instruction. For example, an eight bit OP CODE provides the ability to perform a 256 way branch to the beginning of up to 256 different microprograms. (A microinstruction is also called a "control word" (CW), and a CW is the coding within a control-word position in the control store.)

Many current computer systems generally have their control stores organized so that a group of control word positions, called a "branch group", are accessed in a single addressing cycle of the control store. Current machine condition state signals determine the selection of one control word position in the addressed branch group in order to obtain the next control word to be executed in the CPU. Basic control store hardware is provided for accessing the control store with a CW select signal which is responsive in part to CW emit signals derived directly from the microinstructions and in part from machine-state signals provided externally to the micro-instructions. The machine-state signal possibilities determine the number of microcode branches available, which often provides fewer CW choices than the number of positions in a branch group. Thus, a choice between two CW's is a two-way branch, etc.

The main advantage of branch group addressing is that it minimizes the time for accessing the next control word by allowing the machine state signal generation and CW selection operations to overlap the accessing of the next branch group of control words in the control store. (The machine-state signal selection of a single control word from available branch choices in an accessed branch group is called a "control store branch operation". Each control word contains a "next address" which is the address of the branch group containing the next control word to be selected.)

In more detail, the next address in the current control word is fed to the control-store address decoder for accessing the next branch group while the outputs of machine-status signal circuits are fed to a branch-address decoder for selecting the CW position containing the microinstruction to be next performed. The required machine-state signals may not be available to a current micro-instruction until after it begins execution. Hence the CPU clock pulses will make the selection in the next CW near the end of a CW clock cycle.

In prior systems, if a given microinstruction is often used in several different micro-routines, the same microinstruction may be stored at several different control word locations within the control store because of different machine-state selection criteria. This replication is one factor which tends to increase the required size of the control store.

A problem that exists in the engineering of CPU controls is that the hardware controls are designed at an earlier time and often by different people than those who design the microprograms which operate the CPU hardware to execute the system instructions architected for the machine. The microprograms which are later designed to control the hardware will inevitably contain branching involving a choice among plural target control words. Such branching must anticipate all of the types of branching possible, e.g. two-way branches, three-way branches, four-way branches, etc. Thus, within a single machine cycle used to execute a single control word, a microprogram branch of up to N ways in an N word branch group may be made. A branch of more than N ways requires more than one control word. It has been found that more than four-way branches are rare. Hence, a branch group having four words can efficiently support almost all microprogram branches in a single machine cycle.

As previously mentioned, the final selection of a control word within a branch group is made near the end of the execution of the current control word cycle in response to the currently existing machine-state signals and the emit field in the current control word. For example, a two-branch in a microprogram may require a choice between the first and fourth control words in a four-word branch group, or perhaps between its first and third words, or between its second and fourth, or between its second and third control words. Likewise, a three-way branch in a microprogram may require a selection among any three words in a four-word branch group, for example, among its first, third and fourth control words, or among its first, second and fourth control words, etc., allowing for all three-way combinations in the branch group. Similarly, a four-way choice must be available among all four control words in a four-word branch group. Furthermore, in some cases only a predetermined one of the control words can be selected.

Thus, any word combination in any branch group might be required by some microprogram branch. Hence, it is desirable that in designing the hardware controls for the control store that total word-selection flexibility be made available to permit any microprogram to make any branch choice among any subset of words in a branch group. Thus, with four control words in a branch group, it is possible to have up to 256 combinatorial branch choices among its four control-word positions, allowing for all Boolean relationships in the selection process.

It is possible to provide a large number of special hardware logic circuits that will support all of these logical Boolean combinations (e.g. 255 circuits) in the selection hardware.

If total selection flexibility is not permitted, it is likely that some control word duplication will result. The consequence is a requirement for a larger control store, which increases costs and may have slower access time. Thus, if control-storage space is limited, for example, by restrictions established in the design specification to meet CPU price and performance criteria, each wasted micro-instruction control-word space can be quite significant. For example, in the design of one prior system in which the specifications called for 2,816 microinstructions, each 90 bits in length and each selected in accordance with the state of two independently varying machine-state control signals (i.e. supporting up to four-way conditional branching), it was found that almost all of the planned control storage matrix space was required to implement the immediately required instructions and their support, so that the amount left in reserve was then insufficient to meet requirements initially specified for reserve. In analyzing the situation more closely, it was found that in excess of one hundred control words were redundant.

A general discussion relating to the method of implementing a microprogram control store can be found in an article entitled "Microprogram Control For System/360" by S. G. Tucker found in the IBM Systems Journal, Vol. 6, No. 4, 1967, pages 222–241. This article is herewith incorporated by reference for its showing of methods of control-store addressing, of microinstruction formats, and of methods for decoding control words and making branch selections.

General prior art is also provided by U.S. Pat. No. 3,391,394 issued July 2, 1968, entitled "Microprogram Control For A Data Processing System" by G. H. Ottaway et al; and U.S. Pat No. 3,800,293 issued Mar. 26, 1974, entitled "Microprogram Control Subsystem" by T. A. Enger et al. Pertinent prior art is found in U.S. Pat. No. 3,325,785 issued June 13, 1967, entitled "Efficient Utilization of Control Storage and Access Controls Therefor", by W. Y. Stevens.

U.S. Pat. Nos. 3,800,293 and 3,391,394 are cited for their general background in the microprogram control area. U.S. Pat. No. 3,325,785 deals with the same problem as the subject invention and finds a different solution to it. U.S. Pat. No. 3,325,785 provides a special hardware translation circuit (branch bit converter) between the machine-state signal generator and the word-selection decoder. Special hardware translation circuits are not used by the subject invention which provides a general solution by means of a bit-pattern register loadable by a special field in the control store data register, and provides a unique word selection decoder circuit for generating the CW selection signal by using the loaded bit pattern to control the translation of the machine-state signals in the generation of the CW selection signals. The bit-pattern register technique of this invention provides an improved practical solution to obtaining CW selection flexibility in an economical manner.

SUMMARY OF THE INVENTION

This invention provides a novel approach to solving the control-word selection flexibility problem in a manner which is more economical and technically more attractive than providing the special translation hardware found in the prior art.

The total selection flexibility in the control store accessing hardware provided by this invention allows a micro-code designer to avoid any replication of control words when he can find any branch group in the control store which contains the control words required by his microprogram branch, regardless of the positions of the required control words in the branch group.

It is therefore an object of this invention to provide practical control store selection controls which increase the flexibility in the branch selection of control store control words over that available in known prior control store selection controls.

Another object is to provide control store selection controls which can obtain total flexibility in enabling any microprogram to select among any branch combination of control words in a branch group in the control store.

A further object is to provide control-storage addressing controls which can be conditioned in a single control word cycle to select a next control word in the next branch group at any control word position in the branch group, regardless of any machine-status signal combination restraints.

It is another object of this invention to provide a control-store control hardware arrangement which enables any control word arbitrarily and at any time to be used by different and unrelated microprograms or microroutines in the system without requiring duplication of a control word in a branch group. Thus, a calling microcode sequence is permitted total flexibility in sharing microcode written for another microprogram. This can result in significant savings in the number of control words needed by a system. Also the invention can permit the same microcode to be used in different ways by different calling microcode sequences. For example, a called micro-routine may perform a 24 bit fixed-point add operation wherein it signals an overflow beyond the 24th bit position, or alternatively with translation, the same microroutine might be used to perform a 32 bit fixed-point add operation which instead signals an overflow beyond the 32nd bit position.

It is another object of this invention to provide control store controls having a branch address translation register (BAXR) which can support any Boolean branch relationship in the machine-status signals to select among any combination of control words in a single addressed group in the control store by loading the BAXR register with bit patterns from prior control words.

It is a further object of this invention to support the flexibility in control word selection in branch groups in a control store without requiring hardware circuits with a fixed translation function that must be predetermined when the hardware is designed.

It is still another object of this invention to provide for total flexibility in word selection in any control word group in the control store.

In accordance with these objects, the invention provides a combination of a branch address translation register (BAXR) loaded by a current or a prior control word field, and a word selection circuit for combining the BAXR output with machine status signals to generate a word selection signal in a currently accessed branch group. A switching circuit is also provided so that any current control word can switch off the BAXR output and operate without translation in selecting the next control word. In this manner, the invention obtains addressing flexibility in microcode branch selection.

The size of the BAXR register for supporting total flexibility is $N2^N$ bit positions, where N is the number of machine-state signals provided for branch selection operations in selecting the next CW. Two machine-state signals (providing up to four-way branching) therefore requires an eight bit position BAXR register to support all 256 Boolean translation combinations of such branching to obtain total flexibility. Similarly, three machine-state signals (providing up to eight-way branching) requires a 24 bit position BAXR register to support total branching flexibility, etc.

These and other objects, features and advantages of the invention may be more fully understood and appreciated by considering the following detailed description in association with the accompanying drawings.

DESCRIPTION OF THE DRAWINGS

FIG. 2 is a circuit diagram of a word selection decoder circuit which is included in the system shown in FIG. 1B.

FIG. 4A represents an example of control word selection by a prior control store control system. FIG. 4B represents the improvement in the operation obtainable with special hardware or with the subject invention. FIG. 4C illustrates a BAXR bit pattern and how it more easily obtains CW selection without duplication.

FIGS. 5A, 5B and 5C illustrate another example of how the invention can avoid duplication of control words in a control store by permitting two independent micro-programs to select the same two control words when their selections are independently based upon different machine-state signal combinations.

DESCRIPTION OF A DETAILED EMBODIMENT OF THE INVENTION

Figure 1A:
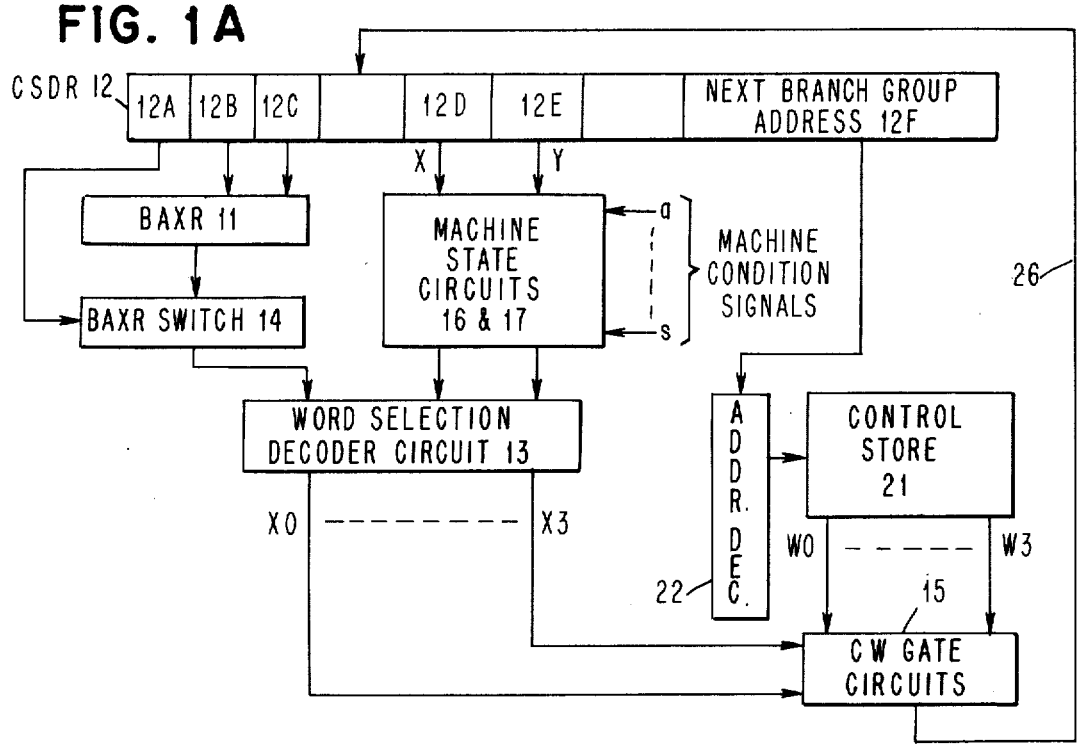
FIGS. 1A and 1B illustrate a control-store branch-selection system designed in accordance with the subject invention.

FIG. 1A illustrates a preferred embodiment of the invention in which a branch address translation register (BAXR) 11 is wired in a path from the output of a control store data register (CSDR) 12, through a BAXR switching circuit 14, to the input of a word selection decoder 13. Decoder circuit 13 has output lines X0, X1, X2 and X3 which provide inputs to control word gate circuits 15 to select the next control word among a branch group of four control words W0, W1, W2 and W3 currently being accessed in a control store 21.

Decoder 13 also receives selected machine state signals A and B provided from microcode machine state logic circuits 16 and 17 of the type conventionally used in the art. Signals A and B are generated from combinations of machine-condition signals a through s which are decoded by a logic-circuit arrangement to resolve the machine-condition signals into separate machine-state signals A and B in the manner currently done in conventional machines. A conventional machine using two machine-states A and B can perform up to four-way branching in the choice of a next control word among four control-word positions contained in an addressed branch group in the control store, due to the four possible combinations of signals A and B, i.e. $\overline{A}B$, $A\overline{B}$, and $\overline{A}\overline{B}$. However, with any particular current control word (CW), the branching required for determining the next CW often is restricted to a subset of less than the four words in the branch group in accordance with the branching choices in the microprogram. For example, the current CW may only allow two possible branch choices determined by either machine states AB or $A\overline{B}$, respectively. Then only two out of the four words in the branch group are needed for selecting the next control word.

BAXR switching circuit 14 is provided between BAXR 11 and decoder 13, in order to switch the BAXR contents into or out of the word selection operation of decoder circuit 13. The BAXR 11 is switched into the control-word selection operation by having a one bit state in a USE BAXR field 12A in the CSDR 12. When the BAXR contents are switched in, the decoder output is selected by signals on both the machine-state lines A, B, and the bit pattern in BAXR 11.

A zero bit in field 12A switches the BAXR out of the control store operation, in which case the decoder output is selected only as a result of the machine-state lines A, B, without regard to the bit pattern in BAXR 12.

Control store (CS) is constructed from high speed flip-flop circuits in an array arrangement which may be of the conventional type. The CS simultaneously accesses four words W0-W3 in response to the CS address decoder 22 receiving the next branch-group address (NA) signals from field 12F in CSDR 12. Hence, four words W0, W1, W2 and W3 are simultaneously energized at the decoded address in control store 21, and they are provided to respective word gates in the CW select circuits 15. Also, the word gate circuits 15 receive the selection output lines X0–X3 from decoder 13. One and only one of lines X0, X1, X2 or X3 is actuated by decoder 13, so that only one of the select gates in circuits 15 is actuated in response to the next branch group address provided from CSDR 12. Consequently, only the selected one of words W0–W3 (which is the result of the branch operation) is transferred to a bus 26, from which the selected control word is loated into CSDR 12. CSDR 12 is loaded by a clock pulse near the end of a CW cycle.

Figure 1B:
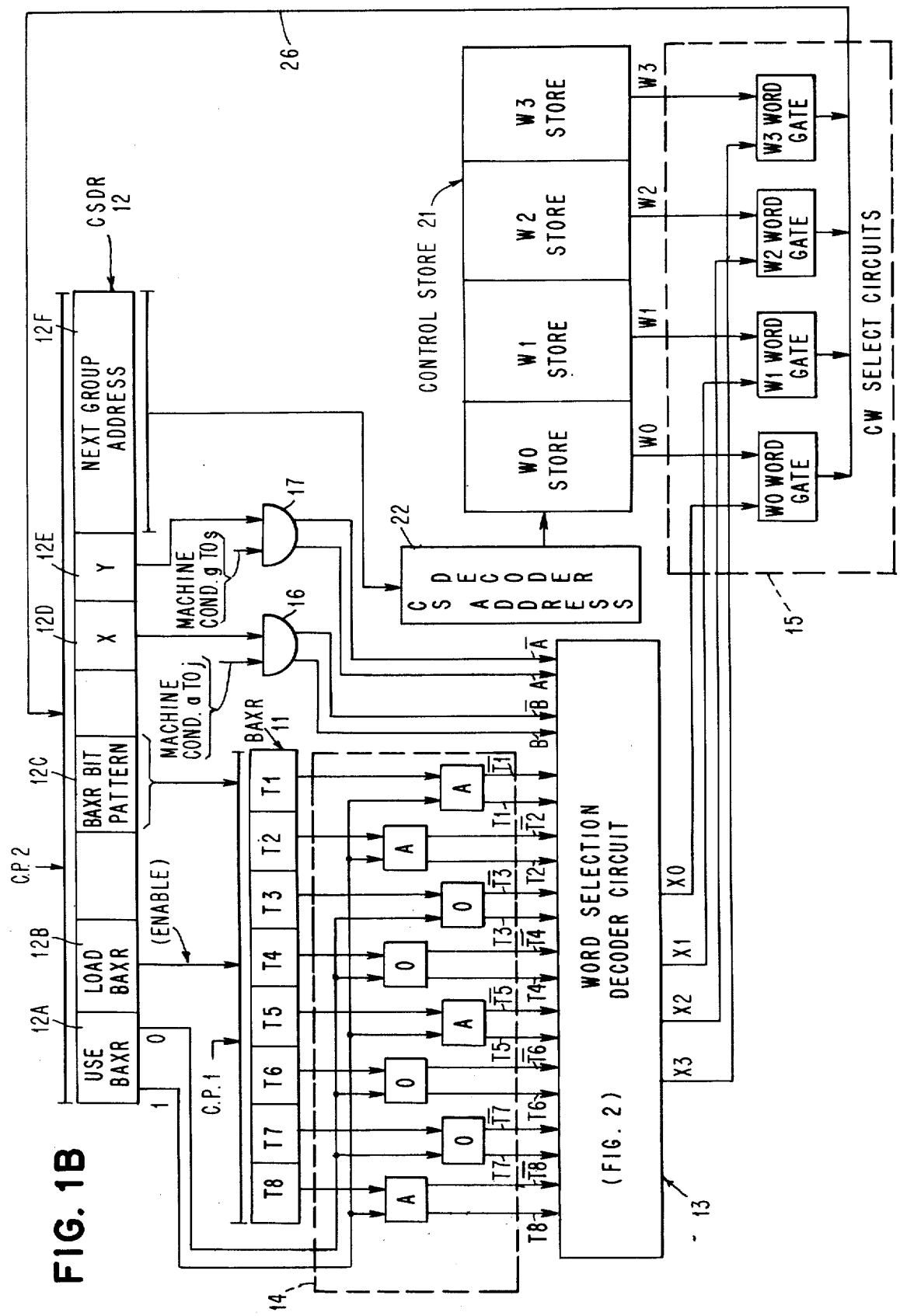

FIG. 1B shows in more detail the system generally shown in FIG. 1A. Thus, in FIG. 1B, the next control word loaded into CSDR 12 upon coincidence of clock pulse 2 (C.P.2) applied to the ingate of CSDR 12. The newly-loaded control word thus becomes the current control word to begin a new CW cycle. Its field 12F is now transmitted to address decoder 22 to access a branch group in control store 21 from which a next control word will be selected. In this manner, each selected control word is loaded into CSDR 12 to cyclically become the current control word containing the next address for starting the accessing of the next branch group.

The CSDR 12 is conventional, except for its novel fields 12A, 12B, and 12C. Field 12C is a special field which may contain the translation bit patterns which are set into BAXR 12. Field 12B controls whether field 12C is loaded into the BAXR 11. As previously mentioned, field 12A may be a single bit; it provides complementary outputs that control whether or not the current BAXR 11 content is to be used by the current control word for selecting the next control word. The complementary outputs illustrated for field 12A in FIG. 1B cause the BAXR 11 content to be used in selecting the next control word; that is translation is switched in. However, if the CSDR bit in field 12A is reversed, the complementary outputs of field 12A are reversed, which causes the pattern in BAXR 11 to be switched-out of use; that is, no translation occurs since the BAXR contained bit pattern does not then affect the selection of the next control word, no matter what the content of BAXR 11 happens to be. The switching-out operation in effect causes switching circuit 14 to force a bit pattern of 01101100 into decoder inputs T8–T1 respectively, wherein 0 is a down *dc* level and 1 is an up *dc* level on the true outputs of the respective AND and OR circuits in switching circuit 14.

The LOAD BAXR field 12B also may be a single bit which at clock pulse 1 (C.P.1) controls the ingating into the BAXR 11 of the bit pattern found in special field 12C. When the LOAD BAXR field 12B is set to its disabled state, these bits in the special field 12C are not loaded into BAXR 11, and they are then available for other CW uses in any conventional manner. Thus, when the LOAD BAXR field 12B disables the BAXR ingating and the USE BAXR field 12A is enabled as shown in FIG. 1B, the previously-loaded BAXR content is undisturbed and is used by the current CW to select the next control word.

It is generally preferably that the loading of BAXR 12 be done by a prior control word rather than by the current control word, due to timing considerations in execution of the current control word.

The X and Y fields 12D and 12E in CSDR 12 are conventional machine-state mask fields that determine which machine conditions are to be used in the current control word selection operation (i.e. current branch determination). For example, the X field may have five bits which may be coded to control the masking of up to 32 machine conditions *a* to *j* for controlling their inputting into logic circuit 16 in the conventional manner. That is, the machine-conditions which are masked-in are used by logic circuit 16 in the generation of the complementary signals on lines B and $\bar{B}$. Likewise, field Y may, for example, also have five bit positions coded to control up to 32 different machine conditions *g* to *s* (some of which may also be included in the set *a* to *j*) for controlling inputs to logic circuit 17 which is similar to logic circuit 16 in the conventional manner to control the complementary signals on output lines A and $\bar{A}$.

FIG. 2 shows a detailed circuit arrangement for the word selection decoder circuit 13. It comprises four sets of AND circuits 41A-D, 43A-D, 45A-D and 47A-D. Each set has its outputs connected to a respective OR circuit 42, 44, 46 and 48 which provide the respective output lines X0, X1, X2 and X3. The operations of the circuit in FIG. 2 satisfy the following Boolean logic expressions:

$$X0 = \bar{A}\bar{B}\ \overline{T1T2} + \bar{A}B\ \overline{T3T4} + A\bar{B}\ \overline{T5T6} + AB\ \overline{T7T8}$$

$$X1 = \bar{A}\bar{B}\ \overline{T1}T2 + \bar{A}B\ \overline{T3}T4 + A\bar{B}\ \overline{T5}T6 + AB\ \overline{T7}T8$$

$$X2 = \bar{A}\bar{B}\ T1\overline{T2} + \bar{A}B\ T3\overline{T4} + A\bar{B}\ T5\overline{T6} + AB\ T7\overline{T8}$$

$$X3 = \bar{A}\bar{B}\ T1T2 + \bar{A}B\ T3T4 + A\bar{B}\ T5T6 + AB\ T7T8$$

The set of AND circuits 41A-D satisfy the expression for X0. The expressions for X1, X2 and X3 are satisfied by the respective sets of AND circuits 43A to D, 45A to D, and 47A to D.

OPERATION OF THE EMBODIMENT

Figure 3:
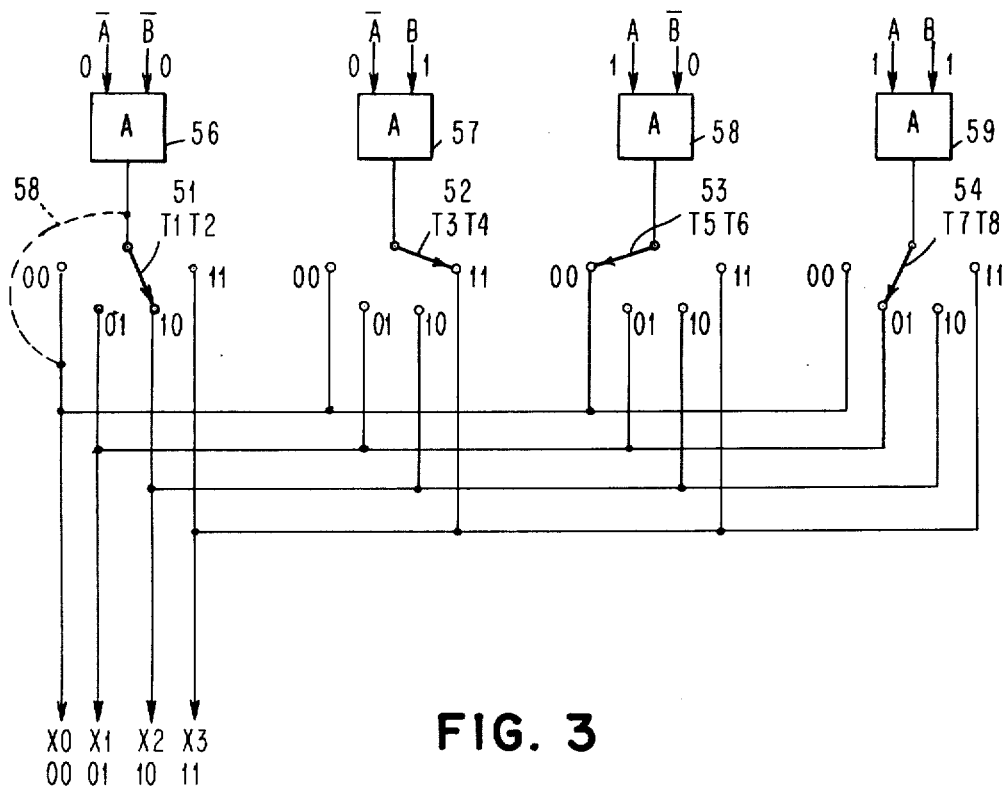
FIG. 3 represents how the embodiment in FIG. 1B operates in the selection of a control word from a branch group of control word positions being accessed in the control store.

FIG. 3 is provided to assist the explanation of the operation of the BAXR 11 in the control word selection performed by the embodiment in FIG. 1B. The bit positions in BAXR 11 are divided into subsets, each subset comprising a number of bit positions equal to the number of independent machine-state signals. The number of subsets in the BAXR 11 (i.e. pairs T1T2, T3T4, T5T6 and T7T8) corresponds to the number of combinations of machine-state signals A and B (i.e. the four combinations $\bar{A}\bar{B}$, $\bar{A}B$, $A\bar{B}$ and AB, respectively), and each subset represents a different combination. Each subset of bit positions in BAXR 11 can be set to cause its particular machine-state signal combination to select any one of the four output selections X0, X1, X2 or X3.

In FIG. 3, each switch 51, 52, 53 and 54 corresponds to a respective subset (e.g. pair) of bit positions in BAXR 11, e.g. T1T2, T3T4, T5T6 and T7T8 respectively. The switches 51, 52, 53 and 54 are set independently of each other to represent the independent settings of the subsets.

Each switch has four settings which correspond to the four selectable outputs X0, X1, X2 or X3. This switching of any one of the four input combinations, i.e. $\bar{A}\bar{B}$, $\bar{A}B$, $A\bar{B}$ and AB) to any output X0, X1, X2 or X3 is herein called "translation of the A AND B machine-state signals".

The four settings of each switch represent all possible output selections for one subset of bit positions in BAXR 11, e.g. T1T2 by switch 51, T3T4 by switch 52, T5T6 by switch 53 and T7T8 by switch 54.

In more detail, the setting of switch 51 represents the T1T2 combinations which select one of the four outputs X0, X1, X2 or X3 when the A AND B signal is 00. Switch 52 represents the T3T4 combinations which select one of the output X0, X1, X2 or X3 when A AND B is 01; switch 53 represents the T5T6 combinations which select one of the four outputs when A AND B is 10; and switch 54 represents the T7T8 combinations which can select any one of the four outputs when A AND B is 11.

In this manner, the four switches represent all possible settings in the eight bit positions of BAXR 11 to obtain any one of the 256 combinations.

In this manner, the settings of the four switches 51, 52, 53 and 54 in FIG. 3 represent the bit pattern contained in BAXR 11. (The bit pattern was previously loaded into BAXR 11 from the special field 12C in CSDR 12 in the current or some prior control word.) The particular switch settings illustrated in FIG. 3 represent the bit pattern 10, 11 00 and 01 in the BAXR bit positions T1T2, T3T4, T5T6, T7T8 respectively, which example translates $\bar{A}B$ (i.e. 00) to X2, $\bar{A}B$ (i.e. 01) to X3, $A\bar{B}$ (i.e. 10) to X0 and AB (i.e. 11) to X1. Therefore, after a particular setting of the four switches, the selection operation is determined by the current machine-state signals A and B to actuate one of the AND circuits 56, 57, 58 or 59 which thereby controls the word selection signals X0, X1, X2 or X3 through the current settings of switches 51, 52, 53 and 54.

FIG. 3 also represents a variation on the embodiment shown in FIG. 1B. The variation provides BAXR 11 with six bit positions by eliminating the T1T2 bit position subset from BAXR 11. This elimination of T1T2 is represented in FIG. 3 by replacing switch 51 with a permanent wire connection 58 located from AND circuit 56 to output line X0. Only the remaining bit position subsets T3T4, T5T6, and T7T8 may then be flexibly controlled by the bit pattern loading of BAXR 11. Hence, it is possible to reduce the size of BAXR 11 at the expense of reducing the available translation flexibility. For example, the elimination of two bit positions in BAXR 11 (reducing it to a six bit position register, e.g. by removing subset T1T2) reduces the available number of translation combinations to 128. But this has the desirable result of shortening the BAXR loading field in the CSDR 12, since the number of required bit positions in the control words needed to load the BAXR is now six bits in the special field 12C instead of the eight bits needed to load an eight bit BAXR. With some machines, a prior designed control word size may require this trade off of a reduced number of BAXR bit positions versus some translation flexibility, as long as sufficient flexibility remains to satisfy all, or most of, the translation requirements required in the machine. A microcode designer may not necessarily be significantly restricted by a two bit reduction in BAXR 12 when he discretely plans the use of the inflexible CW position in each branch group, allowing the flexibility to be used advantageously in the choices among the remaining CW positions.

Accordingly, translation flexibility can be controlably reduced by removing any one or more subsets of bit positions in the control words that are loadable into the CSDR 12; then BAXR 11 may be made correspondingly smaller.

The subject invention may be used in many different ways to permit more efficient use of the word locations in the control store, whether the word positions in any branch group are used by the same or different microcode routines. A few examples will be given hereafter in order to illustrate the improved efficiency in control store use permitted by this invention, since the resulting improvement in the flexibility of control word positioning may not be apparent to the reader up to this point.

The following simple examples of two-way branching are provided to illustrate how the invention can be used by a microcoder to avoid duplications of control words in the control store. In one example, the execution of a particular control word results in an Exclusive-OR condition for the signals A and B, i.e. result ($A\bar{B} + \bar{A}B$) or result ($\overline{AB} + AB$). The first result is used to select a control word CW0, while the second result is used to select a control word CW1. FIG. 4A shows the manner of operation with conventional control stores used to perform this Exclusive-OR operation in which all four control word positions in a control group must be used. That is, CW0 is put into positions 1 and 2, while CW1 is put into positions 0 and 3. Hence, each control word is duplicated in the branch group. Thus, the first Exclusive-OR result selects either position 1 or position 2, while the second result selects either position 0 or position 3. It is possible to avoid this control word duplication for this particular Exclusive-OR operation by providing special hardware 81, represented in FIG. 4B, that will recognize the occurence of this Exclusive OR operation and then connect line AB and line $\overline{AB}$ to position 0 to select CW1, and connect line $\bar{A}B$ and line $A\bar{B}$ to position 1 to select CW0. Such a special hardware entity is dedicated to the recognition of a particular Exclusive-OR situation for signals A and B; and it would be just one of a large number of special hardware circuits required to recognize other particular logical combinations of signals A and B for causing other switching of the input lines to the CS outputs to obtain required selections. This would result in a very expensive control-store select system, which this invention avoids by providing a much more economical solution to the problem of avoiding control-word duplications in the control store.

The invention accommodates the same Exclusive-OR operation without any duplication of control words and without requiring any special hardware circuitry. The BAXR has general use among all machine-state signal logic operations regardless of their complexity. For this particular Exclusive-OR operation, the invention merely loads the BAXR with the bit pattern illustrated in FIG. 4C. Then machine-state $A\bar{B}$ and $\bar{A}B$ (i.e. 01 or 10) automatically causes decoder 13 to select CW0 in position 1 (i.e. X1), and the machine-state $\overline{AB}$ or AB (i.e. 00 or 11) automatically causes decoder 13 to select CW1 in position 0 (i.e. X0). Hence, CW positions 2 and 3 are available for uses by other control words which may be found in the the same or other microprograms.

Another simple example of the invention avoiding control word duplication (done by prior CS controls) is illustrated in FIG. 5A, where two separate microprograms 1 and 2 are illustrated. Control word CW(f) in microprogram 1 and control word CW(p) in microprogram 2, each select a next control word from the same two choices, CW1 or CW2. However, CW(p) and CW(f) use different machine-states to perform their selections. For example, CW(f) uses machine-state A (e.g. doesn't care about machine state B) to select CW1, but CW(2) selects CW1 with the complementary machine-state $\bar{A}$. Hence CW(f) and CW(p) select between the same two control words CW1 and CW2, but in a reverse manner with respect to machine-state signals A and $\bar{A}$. Conventional CS controls duplicate CW1 and CW2 in branch group positions X2 and X3 which were selectable only by CW(p) as a function of the $\bar{A}$ or A machine-state, while CW(f) selects only between CW1 and CW2 in positions X0 and X1 as a function of the A or $\bar{A}$ machine-state.

However, the subject invention can very simply eliminate the need for the duplication of the control words in positions X2 and X3, leaving these positions available for some other use. This is done by loading the BAXR 12 with the pattern shown in FIG. 5B prior to CW selection by CW(f) in microprogram 1; and by loading BAXR 12 with the bit pattern shown in FIG. 5C prior to CW selection by CW(p) in microprogram 2. Thus, the loaded pattern shown in FIG. 5C obtains the reverse selection of CW1 and CW2 from their selection by the pattern in FIG. 5B in response to the reverse conditions for machine state A. Therefore, positions X2 and X3 are not used by either CW(f) or CW(p). Hence, the two bit patterns in FIGS. 5B and 5C permit the different microprograms to select between CW1 and CW2 positions X0 and X1 in different ways.

Two microcode sequences may therefore join at the same microinstructions with the use of this invention even though the microinstructions (i.e. control words) are selected with different machine-state signals by the two sequences. For example, a micro-routine 1 must make a two-way branch when its machine-state signals are 00 (i.e. $\overline{AB}$) or 01 (i.e. $\bar{A}B$) to select between two control words in the next addressed branch group. However, micro-routine 2 requires a two-way branch when the machine state signals are 10 (i.e. $A\bar{B}$) or 11 (i.e. AB). Without the BAXR, conventional microcode controls duplicate CW's in positions X0, X1 for micro-routine 1 and in positions X2 and X3 for micro-routine 2. However, with this invention, the BAXR is set to the pattern 00010001 in T1-T8 respectively which causes both routines to select between the same two CW's in positions X0 and X1, thereby avoiding any use of positions X3 and X4 which are left available for some other use.

Figure 6:
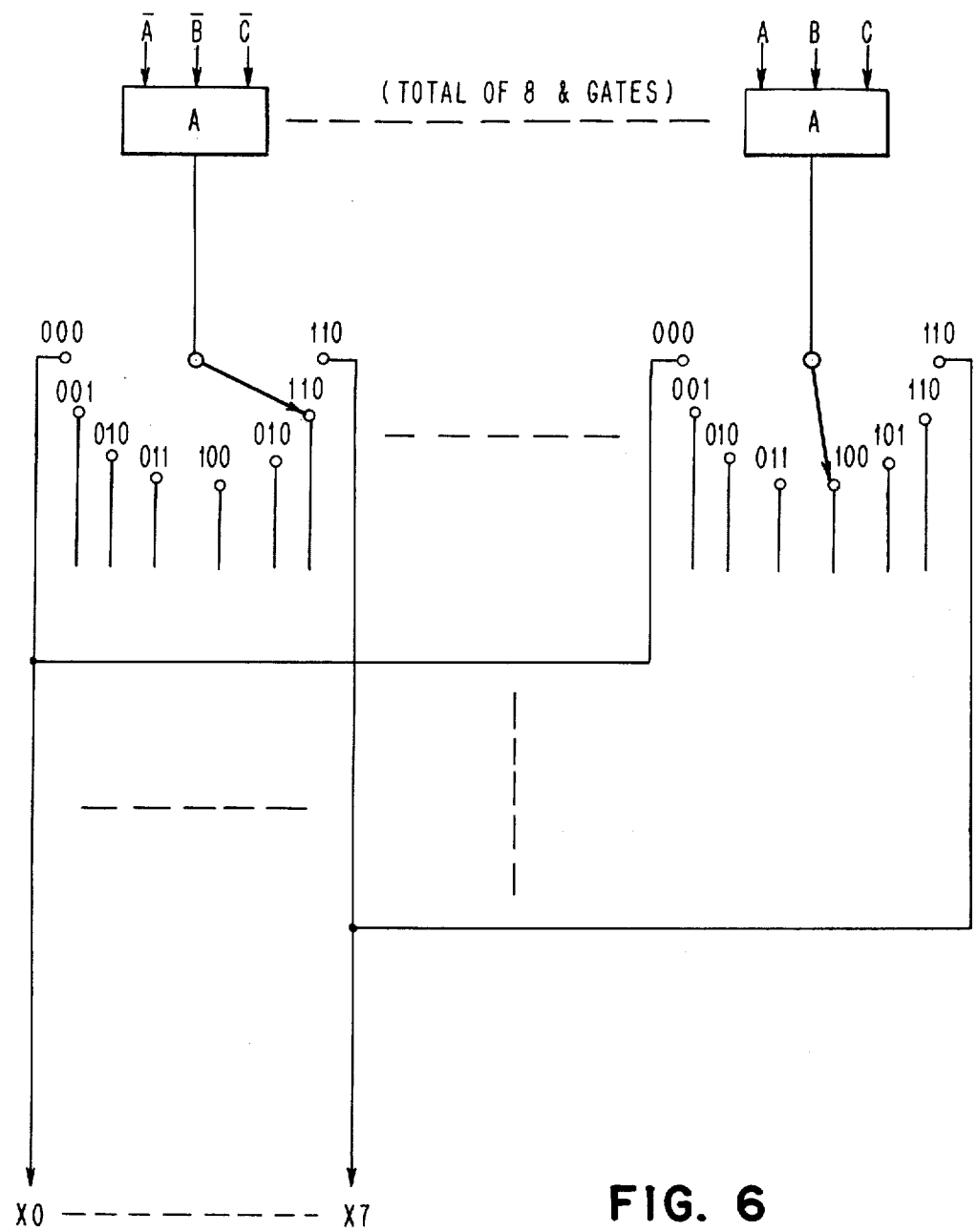
FIG. 6 represents an embodiment of the invention that selects each next CW in branch groups containing eight control words by using three machine-state signals A, B and C.

Although the detailed embodiment uses two machine-state signals A and B for selecting each next control word in a branch group containing four control words, it is apparent that the invention is just as applicable to a system using three or more machine-state signals for selecting among a branch group containing a plurality of control words. For example, three machine-state signals A, B, and C may be used to select the next control word in branch groups containing from five to eight control words. FIG. 6 represents an embodiment using branch groups with eight control-word positions respectively represented by the output lines X0 through X7, and having three machine-state signals represented by inputs A, B, C and their complements that provide eight input combinations represented by AND circuits 71–78 in FIG. 6, which respectively connect to eight switches 81–88, each having eight positions that respectively connect to eight output lines X0 through X7. The arrangement in FIG. 6 provides for a translation of all of the possible bit patterns for three machine-state signals by the BAXR. The BAXR will have eight subsets, each with three bit positions (since there are three independent machine-state signals) for a total of twenty-four bit positions (i.e. 8X3 = 24) to provide all of the possible translation combinations. The generalized relationship between the number of bit positions T in the BAXR and the number of machine-state signals N is $T = N2^N$ to accommodate all translation possibilities.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a control store control system which has a control store containing branch groups of control-word positions, a branch group accessed by a next address from a current control-word contained in a control store data register, and machine-state circuits providing machine-state outputs used for selecting a control-word position in the branch group accessed in the control store, the improvement comprising,
    a branch address translation register (BAXR),
    a special BAXR field in the control store data register, a BAXR in-gate circuit connected between the special BAXR field and the BAXR,
    a word selection decoder circuit having inputs connected to said machine-state outputs, means for connecting outputs of the branch address translation register to inputs of the word selection decoder circuit, whereby said word selection decoder circuit activates one of plural control-word select lines in response to said machine-state outputs and a bit pattern set in said branch address translation register.

2. In a control store control system as defined in claim 1, in which said BAXR further comprises a plurality of subsets of bit positions, each subset having a number of bit positions equal to the number (N) of independent machine-state outputs.

3. In a control store control system as defined in claim 2, in which $2^N$ subsets are provided in said BAXR, whereby total output selection translation flexibility is obtainable if the number of bit positions in the BAXR is equal to $N2^N$.

4. In a control store system as defined in claim 2, in which less than $2^N$ subsets are provided in said BAXR, whereby fewer than $N2^N$ bit positions in a control word are used for loading said BAXR in a trade-off for less than total output-selection translation flexibility.

5. In a control store control system as defined in claim 1, further comprising,
    enabling means for the BAXR in-gate circuit connected to an output of a LOAD BAXR field in the control store data register, said BAXR in-gate circuit being conditioned by said enabling means to load said special BAXR field into said BAXR.

6. In a control store control system as defined in claim 1, in which said means for connecting comprises a BAXR switch for passing or blocking the outputs of the BAXR to the word selection decoder circuit, and
    a control input of said BAXR switch connected to a USE BAXR field in the control store data register to receive BAXR passing or blocking signals from the USE BAXR field.

7. In a control store control system as defined in claim 6 in which said BAXR switch comprises a plurality of AND and OR circuits having outputs connected to inputs of said word selection decoder circuit, and
    the control input of said BAXR switch receiving complementary outputs of said USE BAXR field that are connected to inputs of the AND and OR circuits,
    whereby said BAXR switch generates a predetermined bit pattern which is transmitted to said word selection decoder circuit while said USE BAXR field is providing a BAXR blocking output signal, and whereby said BAXR switch passes the output of the BAXR to the word selection decoder circuit while said USE BAXR field is providing a BAXR passing output signal.

8. In a control store control system as defined in claim 1, in which said word selection decoder circuit comprises a plurality of groups of AND circuits, the number of groups being equal to or less than the number of control-word positions in a branch group,
    a plurality of OR circuits, each OR circuit having its inputs connected to the outputs of the AND circuits in a group of AND circuits, the outputs of said OR circuits providing word selection signals for selecting control-word positions in accessed branch groups,
    inputs to said AnD circuits in each group receiving combinations of subsets of outputs of said BAXR and receiving varied combinations of the machine-state outputs, the number of bit positions in a subset being determined by dividing the number of bit positions in the BAXR by the number of independent machine-state outputs.

9. In a control store control system as deferred in claim 8, further comprising a plurality of control-word gates with inputs connected to control-word outputs of the control store, said control-word outputs comprising an accessed control group, and
    said control-word gates also having conditioning inputs connected to the outputs of the OR circuits in said word selection decoder circuit.

* * * * *